United States Patent
Martin et al.

(10) Patent No.: US 8,871,373 B2
(45) Date of Patent: Oct. 28, 2014

(54) ELECTRICAL INSULATOR FOR ELECTROCHEMICAL CELL

(75) Inventors: Charles E. Martin, Georgetown, MA (US); Lucien Fontaine, Lincoln, RI (US); William H. Gardner, East Freetown, MA (US); Keith M. Bibby, Mansfield, MA (US); Dale Beaver, Sterling, MA (US)

(73) Assignee: A123 Systems LLC, Livonia, MI (US)

( * ) Notice: Subject to any disclaimer, the term of this patent is extended or adjusted under 35 U.S.C. 154(b) by 0 days.

(21) Appl. No.: 13/513,542

(22) PCT Filed: Dec. 1, 2010

(86) PCT No.: PCT/US2010/058574
§ 371 (c)(1),
(2), (4) Date: Jan. 7, 2013

(87) PCT Pub. No.: WO2011/068883
PCT Pub. Date: Jun. 9, 2011

(65) Prior Publication Data
US 2013/0108903 A1    May 2, 2013

Related U.S. Application Data

(60) Provisional application No. 61/265,575, filed on Dec. 1, 2009.

(51) Int. Cl.
| | |
|---|---|
| *H01M 2/14* | (2006.01) |
| *H01M 2/16* | (2006.01) |
| *H01M 2/02* | (2006.01) |
| *H01M 2/18* | (2006.01) |
| *H01M 2/22* | (2006.01) |
| *H01M 10/04* | (2006.01) |
| *H01M 2/06* | (2006.01) |
| *H01M 2/30* | (2006.01) |

(52) U.S. Cl.
CPC ............ *H01M 10/0431* (2013.01); *H01M 2/22* (2013.01); *H01M 10/049* (2013.01); *H01M 2/06* (2013.01); *H01M 2/18* (2013.01); *H01M 2/30* (2013.01); *Y02E 60/12* (2013.01); *H01M 10/0404* (2013.01)
USPC ........... 429/129; 429/246; 429/181; 429/142; 429/140; 429/133; 429/132; 429/131

(58) Field of Classification Search
None
See application file for complete search history.

(56) References Cited

U.S. PATENT DOCUMENTS 2,981,778 A    4/1961 Freund
(Continued)

OTHER PUBLICATIONS

International Search Report and Written Opinion for International Application No. PCT/US2010/058574 mailed Jan. 31, 2011. 10 pages.

*Primary Examiner* — Yoshitoshi Takeuchi
(74) *Attorney, Agent, or Firm* — Alleman Hall McCoy Russell & Tuttle LLP

(57) ABSTRACT

An insulation portion for an electrochemical cell having a plurality of slots into which bent electrode tabs are slid through during an assembly process of an electrochemical cell. A latch is disposed adjacent the slots and is movable from a resting position to a biased position to engage the electrode tabs. Attachment of the insulation portion to the electrochemical cell and bending of the electrode tabs can be robotically performed, such that controllers of an attachment device and bending device are in communication with each other.

12 Claims, 12 Drawing Sheets

(56) References Cited

U.S. PATENT DOCUMENTS

| | | | |
|---|---|---|---|
| 3,565,690 A * | 2/1971 | Jochaud de Plessix | 429/94 |
| 4,502,213 A | 3/1985 | Madden et al. | |
| 2004/0146779 A1 | 7/2004 | Haenni et al. | |
| 2007/0105016 A1 * | 5/2007 | Chang et al. | 429/174 |
| 2009/0029240 A1 | 1/2009 | Gardner et al. | |
| 2009/0124099 A1 | 5/2009 | Chen | |

* cited by examiner

ELECTRICAL INSULATOR FOR ELECTROCHEMICAL CELL

FIELD OF THE INVENTION

The present invention generally relates to an electrochemical battery cell. More particularly, the present invention relates to a compact, robust, multifunctional and highly manufacturable rechargeable battery cell.

BACKGROUND

A common way of manufacturing a cylindrical format li-ion cell is to wind a stack of electrodes interleaved with separator material into a spiral structure commonly termed a jelly roll to form an electrochemical cell. The jelly roll is comprised of, for example, anode and cathode electrodes, and a layer of separator material between each anode and cathode. Strips of conductive material, generally referred to as current collecting "tabs" are welded to the anodes and cathodes to provide a means by which current can pass to and from the electrodes. Once the anode, cathode and separator materials are wound, the tabs will protrude from both ends of the jellyroll.

To facilitate manufacturing of electrochemical cells, the current collecting tabs are often made longer than what is required by the final geometry of the cells, which allows the tabs to be folded to provide sufficient length to prevent fatigue of the material. The excess length can result in a short circuit and a non-functioning product. A short circuit can also be caused by a tab's movement due to cell cycling, mechanical shock, and/or vibration loading during the lifetime of the cell. To prevent short circuits, a circular tab insulator with one or more holes that allow tabs to pass through can be used. However, because the relative positions of the tabs can vary, it is difficult to accommodate multiple tabs with the insulator, while providing for an efficient and accurate assembly into an electrochemical cell. Even when the tabs are aligned with each other, installation of an insulator can be difficult. Once the insulator is installed the difficulty can continue with bending the tabs in the correct location. For example, if the tab bend occurs below the level of the separator it can introduce additional stress that may cause eventual failure.

The tabs can be covered with adhesive backed polyimide material, while using additional strips of polyimide tape over the battery cell to prevent the tabs from contacting the cell. However, polyimide tape adhesives soften considerably with exposure to heat or lithium ion cell electrolyte. This allows the tape to move away from its protective position during mechanical shock and vibration loads typical of hybrid electric vehicle (HEV) and plug-in hybrid electric vehicle (PHEV) applications. Even a perfectly formed tab is subject to movement due to cell cycling, mechanical shock and vibration loading during the lifetime of the cell. Because of the short circuit risk, an insulative member may be employed on either end of the jelly roll.

A known insulator 10 is shown in FIG. 1 and used to accommodate four tabs 12, 14, 16, 18 of an electrochemical cell. Step 1 of FIG. 1 shows the rolled top face of a battery and the location of all four tabs as they project from the face of the jellyroll. The insulator 10 is positioned over the end of the jellyroll, and the tabs 12, 14, 16 and 18 are slid through slots 20 in the insulator 10. Afterwards, all four tabs 12, 14, 16 and 18 are bent towards the center axis of the jellyroll over the insulator 10, as shown in step 2. The result is a stack of tabs fanning in a region of up to about 140 degrees over the face of the jellyroll. The tab length may vary, such that the tab closest to the center axis, e.g., tab 18, is the shortest and the tab farthest from the center axis, e.g., tab 12, is the longest.

The tab closest to the center of the jellyroll may be cut to a shorter length than the rest of the tabs, and each subsequent outwardly positioned tab is longer than the previous inner tab. The result is that when all four tabs are folded over, as illustrated in step 2, their ends align the same distance away from the axis of the jellyroll. Once the tabs are lying flat, they are ready to be connected to a terminal of the electrochemical cell. This is accomplished by bending the tabs at an angle, as illustrated in step 3, to consolidate the four tabs into one entity to which the cell's extension tab can be welded. This type of insulator is commonly installed by hand during the manufacturing process. In the completed electrochemical cell, the insulator 10 helps prevent the current collecting tabs 12, 14, 16 and 18 from contacting the electrode of the opposite polarity thereby avoiding a short circuit. Tabs close to the center may initially be bent away from the core, then back towards the core to accommodate longer tabs.

SUMMARY OF EXEMPLARY EMBODIMENTS OF THE INVENTION

According to an exemplary aspect, an insulator for engaging a plurality of electrode tabs of an electrochemical cell is provided. The insulator comprises a plurality of fingers separated from each other by a slot, the slot including a closed end and an open end; and a latch disposed adjacent the open end of the slot. The latch is movable from a resting position to a biased position to engage the electrode tabs. A peripheral edge extends along an outermost one of the fingers to form a wall. A portion of the wall adjacent the latch may be ramped. When the latch is in the biased position a path of entry for at least one of tabs is increased, and the path of entry is decreased when the latch is in the resting position.

In any of the preceding embodiments, a periphery of the latch has grooves that correspond to the fingers.

In any of the preceding embodiments, a plurality of slots are provided, and one of the slots is between each adjacent pair of fingers and between an outermost finger and the peripheral edge.

In any of the preceding embodiments, the fingers merge with each other at a base portion of the insulator, the base portion extends from the peripheral edge to an innermost one of the fingers.

In any of the preceding embodiments, a rib is extended from the peripheral edge to an inner peripheral portion of the insulator for engagement with a device that installs the insulator.

In any of the preceding embodiments, a living hinge extends from the peripheral edge to an inner peripheral portion of the insulator to allow the insulator to bend along a line of the living hinge.

In any of the preceding embodiments, the wall of the periphery comprises a first and second section, the first section extends from the ramp to the living hinge, and the second section extends from the rib to an end of the insulator distal the ramp.

According to another exemplary aspect, robotic device is provided that attaches an insulation disk segment to an electrochemical cell having protruding tabs, the insulation disk segment comprising a rib and a plurality of fingers separated by an open ended slot, the robotic device comprises a moveable arm; a gripper attached to the arm; and a controller that causes the gripper to grasp the rib and rotate the insulation disk segment so as to engage and slide the tabs from the open end of the slot to an inward position of the slot. In an alternative embodiment, the gripper may be attached by use of vacuum device. The vacuum device incorporates a vacuum-pad to mate with the insulator. The vacuum device applies negative pressure to grip the insulator and may continue application of negative pressure until the insulator has been attached to electrochemical cell.

In any of the preceding embodiments, the controller is coupled to an electrode tab bending machine, the electrode tab bending machine provides electrode tab path information to the controller. The controller may direct placement of each piece onto the electrochemical cell according to the path information provided by the electrode tab bending machine.

According to another exemplary aspect, an electrode tab forming device is provided for bending electrode tabs of an electrochemical cell, the electrode tab forming device comprising a holding tool, an anvil, and a controller. The holding tool including, a base portion; a plurality of fingers formed in the base portion; and a plurality of slots formed between the fingers for accepting electrode tabs of an electrochemical cell. The electrode tabs extend from the slots when engaged by the holding tool; and the anvil has an end portion operable to apply force to the electrode tabs. The controller coordinates movement of the holding tool and anvil so that while the holding tool engages the electrode tabs, the anvil applies a force to the electrode tabs extending from the slots, such that the electrode tabs are bent towards the electrochemical cell in an overlapping manner.

In any of the preceding embodiments, the electrode tab forming device further comprising a reverse bend forming tool having a least one finger. The reverse bend forming tool is controlled by the controller to exert a force against at least one of the electrode tabs in a radial direction away from a longitudinal center of the electrochemical cell.

In any of the preceding embodiments, the reverse bend forming tool is disposed above the holding tool when bending the at least one electrode tab. The reverse bend forming tool may have a plurality of fingers that bend a plurality of the electrode tabs.

According to a further exemplary aspect, a method of attaching an insulator portion to an electrochemical cell is provided. The method comprises engaging electrode tabs of an electrochemical cell using a holding tool, such that the electrode tabs are slid between fingers of the holding tool; folding the electrode tabs over the holding tool using an anvil, the anvil having an end portion that pushes the electrode tabs toward the electrochemical cell; controlling movements of at least one of the holding tool and anvil using a controller; and providing a robotic device to attach an insulator portion to the electrochemical cell, the robotic device being controlled to grip the insulator portion and slide the insulator portion between the electrode tabs.

In any of the preceding embodiments, the controller coordinates movement of the holding tool and the anvil so that while the holding tool engages the electrode tabs, the anvil applies a force to the tabs extending from the slots, such that the tabs are bent towards the electrochemical cell in an overlapping manner.

In any of the preceding embodiments, a reverse bending tool is provided over the holding tool while the electrode tabs are protruding between the fingers of the holding tool. The reverse being tool is moved to create a bend in at least one of the tabs by applying a force in an outward radial direction of the electrochemical cell.

In any of the preceding embodiments, the folding of the electrode tabs using the anvil is conducted after the reverse bending tool creates a bend in the at least one of the tabs.

In any of the preceding embodiments, the robotic device is controlled by the controller that controls movement of at least one of the holding tool and the anvil.

In any of the preceding embodiments, the robotic device is provided with an arm; a gripping device; and a robotic controller in communication with the arm and the gripping device, wherein the robotic controller directs the arm and the gripping device to grip the insulator portion and place the insulator portion on the electrochemical cell.

In any of the preceding embodiments, the gripping device rotates the insulator portion in one of a clockwise and counterclockwise direction when placing the insulator portion on the electrochemical cell.

In any of the preceding embodiments, the plurality of electrode tabs are within a span of up to 15° degrees of a centerline of the electrode tabs when engaged by the holding tool. In an alternative embodiment, the plurality of electrode tabs are within a span of up to 30° degrees of a centerline of the electrode tabs when engaged by the holding tool.

In any of the preceding embodiments, location data associated with folding of the electrode tabs is stored in a controller of the robotic device.

It will be appreciated that the above-described features may be implemented in combination with each other.

BRIEF DESCRIPTION OF THE DRAWINGS

The invention is described with reference to the following figures, which are provided for the purpose of illustration only, the full scope of the invention being set forth in the claims that follow.

DETAILED DESCRIPTION OF EXEMPLARY, NON-LIMITING EMBODIMENTS OF THE INVENTION

Exemplary embodiments of the present invention provide tab insulators that can be used on electrochemical cells, such as a li-ion cell for example, to prevent current collecting tabs from contacting an electrode of opposite polarity. One or more embodiments of the invention can also be used on any other suitable battery cells beyond those described herein.

A battery cell can include upper and lower welded end caps. The cell's primary packaging (can and end caps) can be composed of aluminum alloy. The weld seal is typically obtained by laser welding, or optionally by other metal joining methods such as ultrasonic welding, resistance welding, MIG welding, TIG welding. The end caps of the doubly (upper and lower ends) welded container may be thicker than the can wall; e.g., the end caps may be up to about 50% thicker than the can wall. The doubly welded cell packaging can provide significantly greater cell volume than crimped seals or singly welded cells. In addition, the thick end caps improve mechanical robustness of the cell, for example, against crushing. The additional cell modifications incorporated into the cell design permit the use of a doubly welded packaging, which is not otherwise possible or convenient with conventional battery cell designs.

The battery cell package design may use a low weight and highly compact aluminum housing, and is typically an aluminum alloy such as Al3003H14. Aluminum and aluminum alloys provide high specific modulus, high specific stiffness in the structure and a high strength to weight ratio. Aluminum is also one of the few materials that are stable at the cathode potential of a Li-ion cell.

Figure 1:
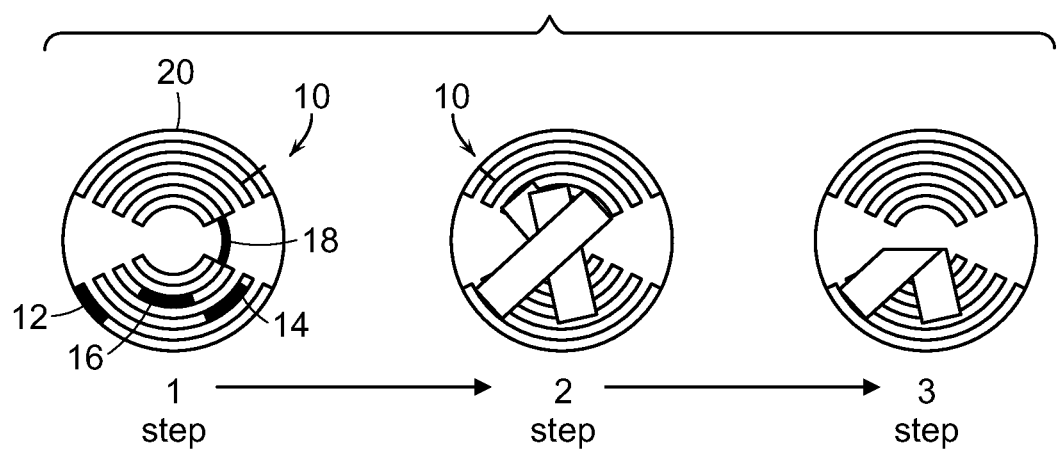
FIG. 1 illustrates a prior art method of insulating an electrochemical cell.
Figure 2A:
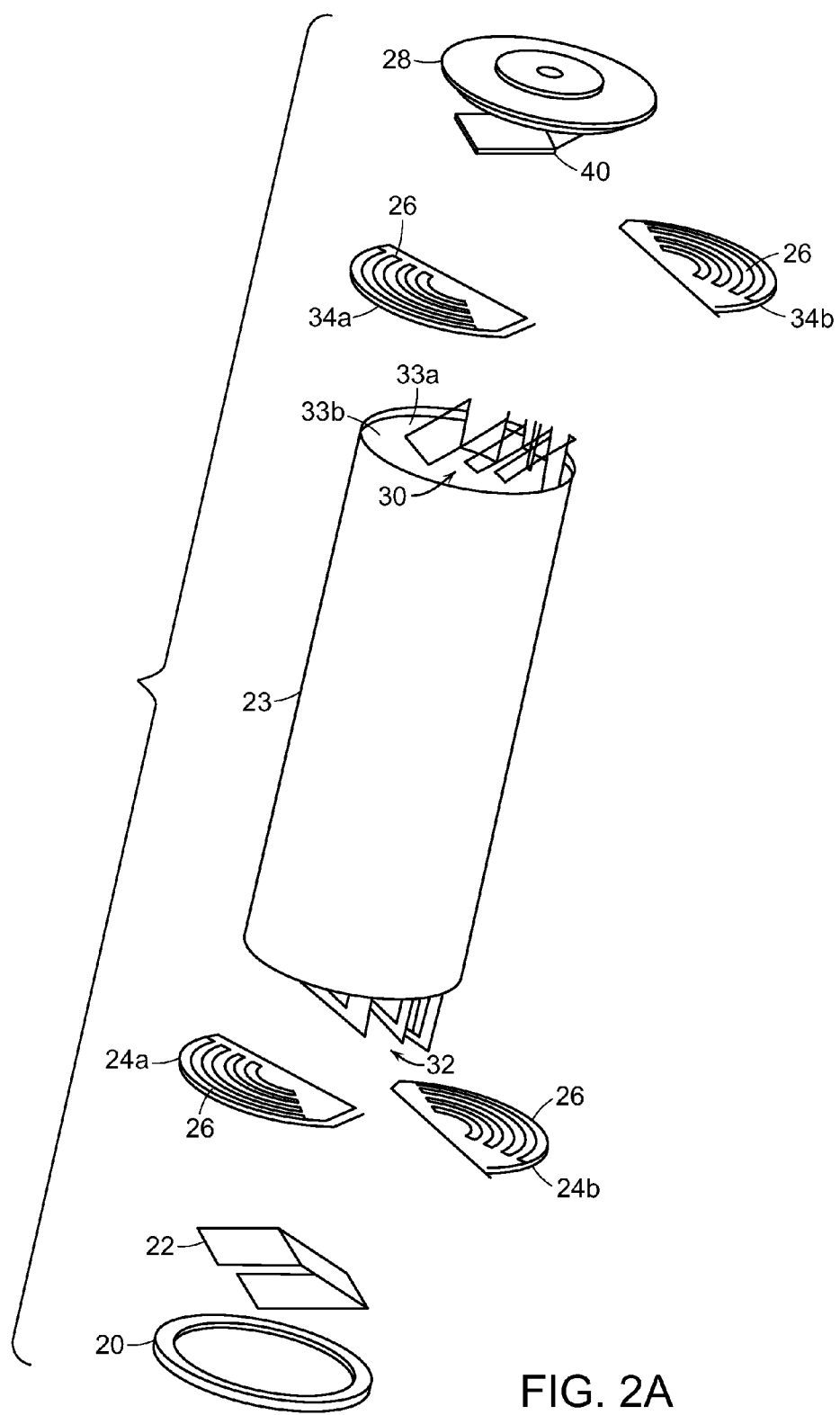
FIG. 2a is an exploded view illustrating components of an electrochemical cell in accordance with an exemplary aspect of the invention.
Figure 2B:
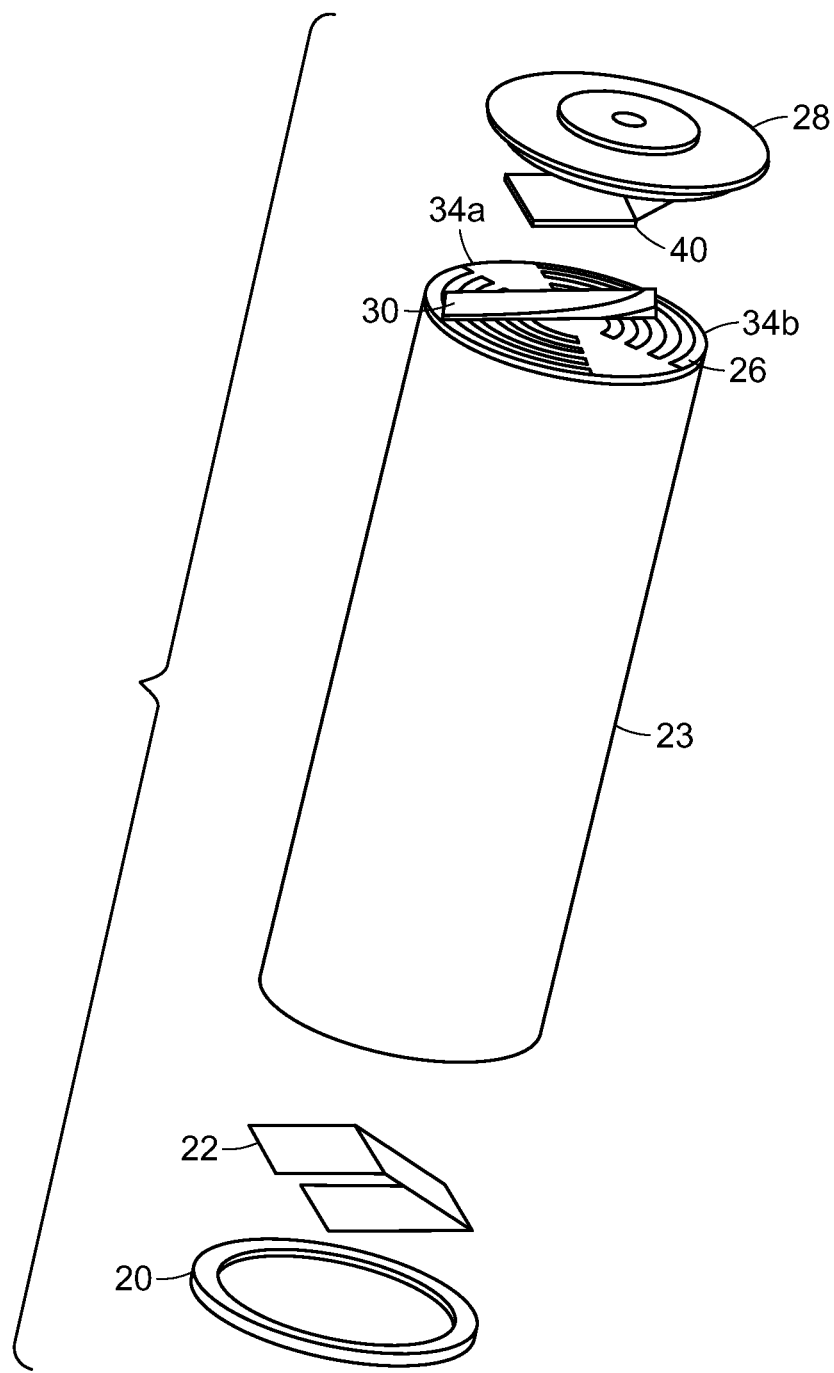
FIG. 2b is an exploded view illustrating components of an electrochemical cell in accordance with an exemplary aspect of the invention.

Features of an electrochemical cell in accordance with an exemplary embodiment are shown in the exploded diagram of FIGS. 2a and 2b. FIG. 2a illustrates insulators portions 34a and 34b in a pre-assembled state. FIG. 2b illustrates the insulator portions 34a and 34b after assembly. In general, the cell includes a positive end cap 20, a cathode extension tab 22, additional insulator portions 24a and 24b, a cylindrical tube 23, a negative end cap 28, anode current collection tabs 30, cathode current collection tabs 32, and internal active cathode and anode materials 33a and 33b (electrodes) inside of the cylindrical tube 23. Although exemplary embodiments discuss cylindrical tubes, other shapes or outer configurations can be utilized. The positive end cap 20 may contain both the positive battery terminal for the cell as well as the cell's vent mechanism. The cathode extension tab 22 acts as an electrical connection between the cathode current collection tabs 32 and the cell's external positive terminal 20. The insulator portions 24a and 24b include slots 26 through which the current collection tabs 32 extend. The insulator portions 24a and 24b are similar to the insulator portions 34a, 34b, and help prevent the cathode current collection tabs 32 and the cathode extension tab 22 from shorting to the internal active cathode and anode materials 33a, 33b. The insulator portions 24a and 24b engage extended electrode tabs 32 after the electrode tabs are bent, as discussed below in more detail.

During assembly, weld and crimp joints are used to connect both sets of current collector tabs 30 and 32 to both end caps 28 and 20, respectively, via the extension tab 22 and the integrated extension tab 40 found in the negative end cap 28. Both end caps are welded to the tube 23 to make the cylindrical cell. The negative end cap 28 may contain both the cell's negative battery terminal as well as the cell's fill hole, both of which share the same internal volume and external space and are symmetrically centered in the cell. The integrated extension tab 40 makes an electrical connection between the anode current collection tabs 30 and the cell's external negative terminal located on the negative end cap 28. The pair of insulator portions 34a and 34b is used at the anode to prevent shorting of the anode current collection tabs 30 and anode extension tab 40.

Figure 3:
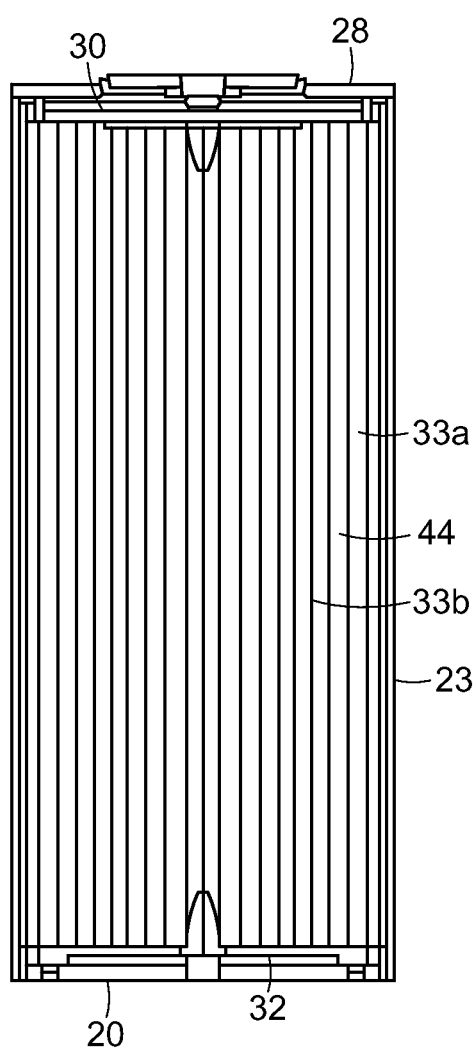
FIG. 3 is a cross-sectional view of the electrochemical cell in FIGS. 2a and 2b.

Components internal to the cell in FIGS. 2a and 2b are illustrated in FIG. 3, where like elements are similarly labeled. Separator layers or separator membranes 44 are provided between the electrodes 33a and 33b. Once assembled, the cell incorporates favorable features for both manufacturing and customer interface in a volumetrically efficient package. This allows for the space inside the cell to be used for active material, greatly improving the cell's energy storage capacity to volume ratio.

Figure 4:
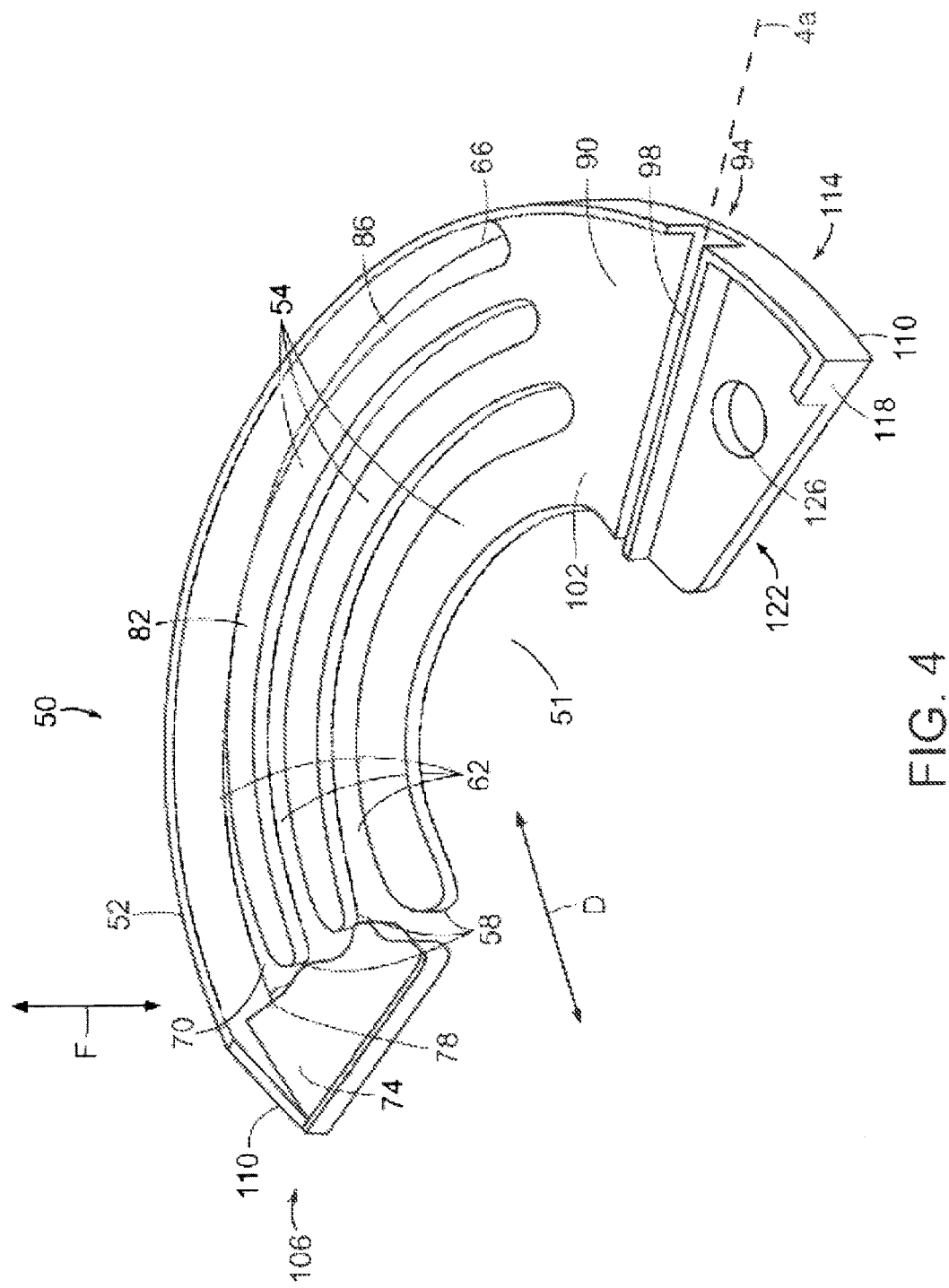
FIG. 4 is an exemplary embodiment of an insulator portion.

FIG. 4 illustrates an exemplary insulator portion 50 that can be used with the embodiments of FIGS. 2a and 2b. The insulator portion 50 has an outer contour that approximates an end face of the cell and has a space or void 51 for accommodating a terminal. The insulator portion 50 is provided with a peripheral edge 52 and a plurality of fingers 54. The fingers 54 may have rounded and/or tapered nose portions 58 to aid in the insertion of electrode tabs, which will be discussed below in more detail. The fingers extend from base 90 with terminal rounded portions 58 distal to the base 90. The fingers 54 are curved to have an arc shape and spaced from each other in a radial direction with slots 62 being provided between adjacent fingers 54. The slots 62 are similarly curved to have an arc shape and include two ends. One end 66 is closed and other end 70 is open to create an entry area for tabs of the electrochemical cell.

Figure 6:
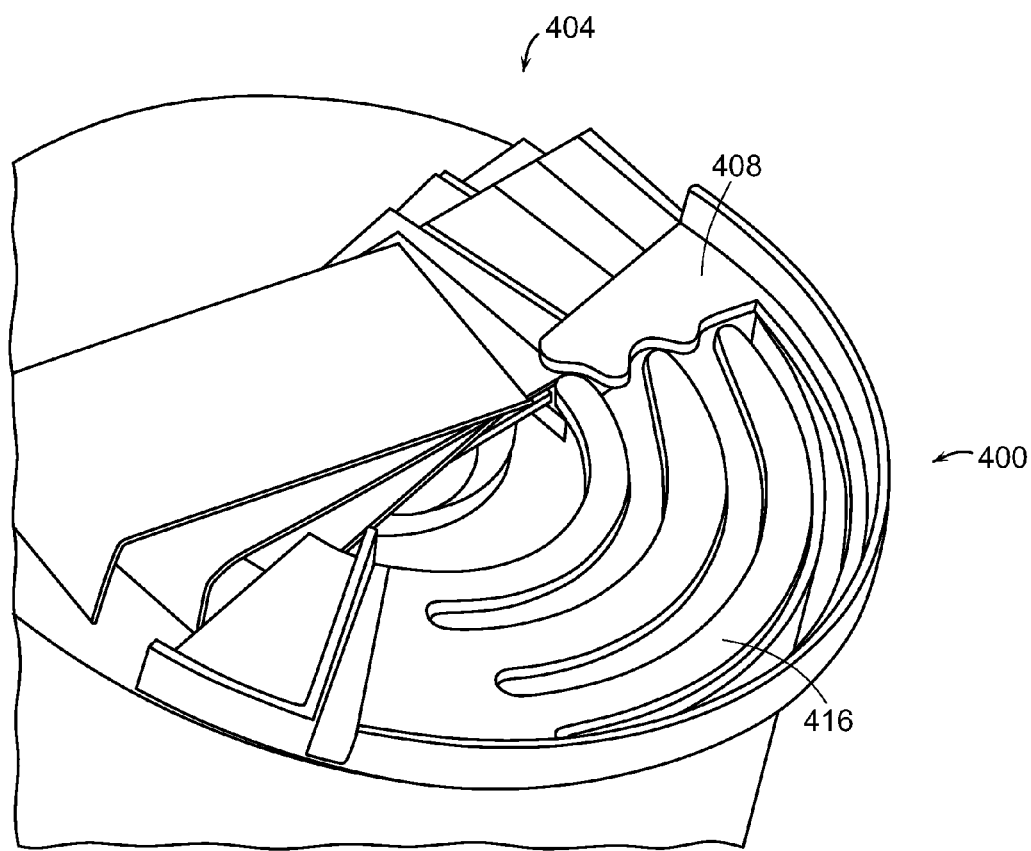
FIG. 6 is an exemplary insulator portion being attached to an electrochemical cell.

A latch 74 extends from a portion of the peripheral edge 52 and has a side area with grooves 78 facing the open end of the slots 62, to act as a gate for entry to the slots 62 along a plane horizontal to the top surfaces of the fingers 54. The latch 74 is in a resting or unbiased position when not acted on by an external force (F), as shown in FIG. 4, and is moved to a biased position when acted on by the force directed perpendicular or at an angle to the horizontal plane. FIG. 6 represents latch 408 in an exemplary biased position, which is likewise applicable to latch 74 in FIG. 4 and the other latches described herein. The latches may be biased in multiple directions, such as along the directions of force (F) in FIG. 4. When the latch 74 is in the biased position a path of entry for at least one of tabs is increased, and the path of entry is decreased when the latch is in the resting position. For example, access to the open end of the slots 62 along the plane in which the fingers 54 lie is increased when the latch 74 is moved upward or downward along a path perpendicular to the plane of the insulator, e.g., axially opened. In an alternative embodiment, the latch may be opened radially instead of axially through the application of appropriate force by moving the latch 74 in or out along a path radial to the fingers 54. As an example, the latch 74 may be moved in the direction D shown in FIG. 4. Also, the latch 74 may be held open during installation by a mechanical element provided on a robotic gripper used to grasp the insulator portion 50, as described in more detail below. The driver pin could be extended to bias the latch 74 to the open position for installation of the insulator. After installation, the driver pin would be retracted.

The slots 62 are provided between each adjacent pair of fingers 54 and between an outermost finger 82 and the peripheral edge 52. The number of fingers 54 and slots 62 may vary depending on factors, including, for example, the tab configuration of the electrochemical cell, the number of tabs and dimensions of the tabs. The outermost slot 86 is bordered by the peripheral edge 52, which comprises a wall extended in an arc shape. The wall serves a function of protecting an inside surface of the can, for example as shown in FIGS. 2a and 2b, from contact by the radially outermost tabs extending from ends of the jellyroll. Such contact between tabs at one potential and a can at another would result in a short circuit condition. A section of tape in the vicinity of the wall may also be used to provide additional protection against short circuit conditions. The fingers 54 merge with each other at the base 90 of the insulator portion 50 at a location spaced apart from the latch 74. The base 90 extends from the peripheral edge 52 to an innermost one of the fingers 54. A living hinge 94 is adjacent the base 90 to allow the insulator 50 to bend along a line 4a-4a of the hinge 94. The hinge 94 provides a flex point to aid with coupling the insulator 50 to an electrode tab configuration, as will be described in more detail below.

An engagement rib 98 is disposed along the hinge 94 and extends from the peripheral edge 52 to an inner peripheral portion 102 of the insulator 50. A function of the engagement rib 98 is to provide a point of contact for a gripper of an installation device. The engagement rib 98 has a structure that is suitable for mating with the gripper and allows the insulator 50 to be manipulated during the installation process.

The wall of the peripheral edge 52 has a first end area 106 proximate to or integral with the latch 74 and a second end area 110 proximate to or integral with a sub-base area 122. The first end area 106 includes a taper, step or ramp 110 that provides clearance for mating with an adjoining insulator. The taper, step or ramp 110 serves to provide clearance between adjoining insulators during insertion of the second insulator and may structurally mesh with a corresponding portion of the adjoining insulator to assist in holding or locking the insulators together. Alternatively, the two insulators may be coupled by use of a mechanical or welded joint so that the insulators are locked or held together after they are installed.

The second end area 110 of the wall has a break and is segmented by the hinge 98 to form a sub-wall configuration 114. The sub-wall configuration 114 extends from the end most portion 110 of the insulator 50 to the hinge 94 and merges with the rib 98. A secondary rib 118 is provided opposite the engagement rib 98 for helping to prevent mating insulators from shingling. As a non-limiting example, "shingling" is a term used in the material handling industry to describe the stacking of parts on a conveyor, vibratory, or other type of feeder system on one another (like shingles on a roof). For example, if one were to try to lay two pieces of paper flat on a table and try to push one with the other, they would likely "shingle" due to their planar nature. However, if one folded the end of both pieces into an "L" shape (a rib) and pushed the "L"'s against one another, the shingling would not happen. The sub-wall configuration 114 and secondary rib 118 partially surround the sub-base area 122. The sub-base area 122 optionally includes at least one through hole 126 that permits gas to escape from the electrochemical cell. Gas may escape from the cell, for example, as a result of overheating. Materials for forming the insulator may include, but are not limited to, polyethylene terethelate (PET), polypropylene (PP), polyethylene (PE), and polyimide (P1). Alternatively, other materials, which would also be compatible with the chemistry of the cell, could be used.

Figure 5:
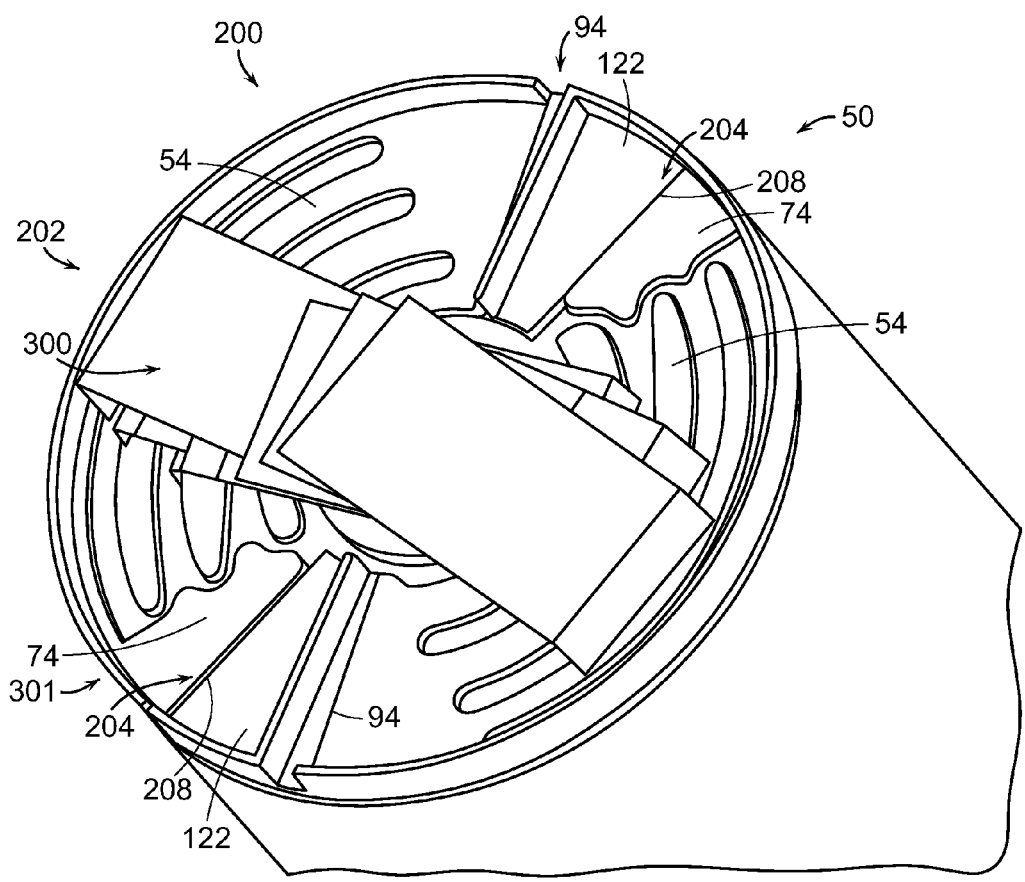
FIG. 5 is an exemplary embodiment of insulator portions attached to an electrochemical cell.

An exemplary disk configuration 200 is shown in FIG. 5 including the insulator 50 of FIG. 4 and a mating insulator 202. The arcs of insulator 50 and mating insulator 202 in combination add up to 360°. It is contemplated that the insulators 50 and 202 may be formed from one unitary insulator, and alternatively may comprise more than two insulator portions that provide an arc adding up to 360°.

With both insulators 50, 202 in place, electrode tabs 300 are protected from impingement from ends of the jellyroll. The disk configuration comprises mating surface portions 204, including an end face 208 of the latch 74 of one insulator, e.g. 50, 202, with an end face of the sub-base area 122 of the other insulator. The sub-base areas 122 of the disk configuration 200 in FIG. 5 do not include the vent holes. However, vent holes may be used depending on design considerations.

The fingers 54 engage the previously folded tabs 300. The fingers 54 can incorporate gripping features, such as jagged edges, tapered edges, and herringbone features that slip by tabs in one direction, but will not allow movement in the opposite direction. The insulator portions 50, 202 are positioned to form a disk configuration after the electrode tabs 300 have been bent. The positioning of the insulator 50 to the insulator 202 is assisted by the ramp 110 described above. Latch 74 provides a hinged locking end that rides over electrode tabs 300 as the insulation portions 50, 202 are threaded between the tabs 300. The latch 74 also prevents intertwining of the insulator portions when they are attached to the cell. Living hinge 94 provides a flex-point which aids during insertion of the tabs 300 into insulators 50, 202. During an exemplary installation, insulator 50 may be placed underneath the tabs 300 by holding the insulator 50 at an angle and rotating the insulator 50 into a space between the tabs 300 and jellyroll, reducing its angle while rotating. The same process can be used to insert the insulator 202. Depending on design considerations, the insulator 50 could collide with the wall 52 of the insulator 202 if the taper, step or ramp 110 (shown in FIG. 4) were not there to provide clearance.

FIG. 6 shows the installation an exemplary insulator after tabs 404 are appropriately bent. An insulator portion 400 and tabs 404 may be similar to those previously described. Insulator portion 400 is positioned with latch 408 placed over the previously bent electrode tabs 404. Fingers 416 are offset and located adjacent to the bent tabs 404. During automated installation, a robot may be used to move the fingers 416 from a first location in plane with latch 408 to a second position in plane below bent tabs 404, so that fingers 416 slide under the tabs 404 and the latch 408 rides above the tabs 404 when insulator portion 400 is rotated. The insulator portions described herein are amenable to robotic installation due to, for example, the latch and finger design. As the fingers 416 are depressed to slide under the tabs 412 using, e.g., a 5 axis robot generated path, the latch 408 is lifted. The robot generated path may replicate the path taken by a tool used to originally form the bent tabs 412, as discussed below in more detail. Once the insulator portion 400 has been installed, another insulator portion will be installed in substantially the same fashion to provide the configuration in FIG. 5. In an alternative embodiment, an insulation disk can be comprised of a unitary component instead of a two-piece configuration or more than two pieces could be used. The geometry of a unitary design would be similar to that of one half of the two piece design with the exception that it would be circumferentially extended to encompass a nearly full 360 deg arc as opposed to the 180 deg arc of each of half of the two piece design. An alternative unitary design is to simply use only one half of the two-piece insulator. Such an embodiment would only be practical when tabs exiting the jellyroll do so in a single grouping as is often the case in jellyrolls with only 4 tabs.

Figure 7:
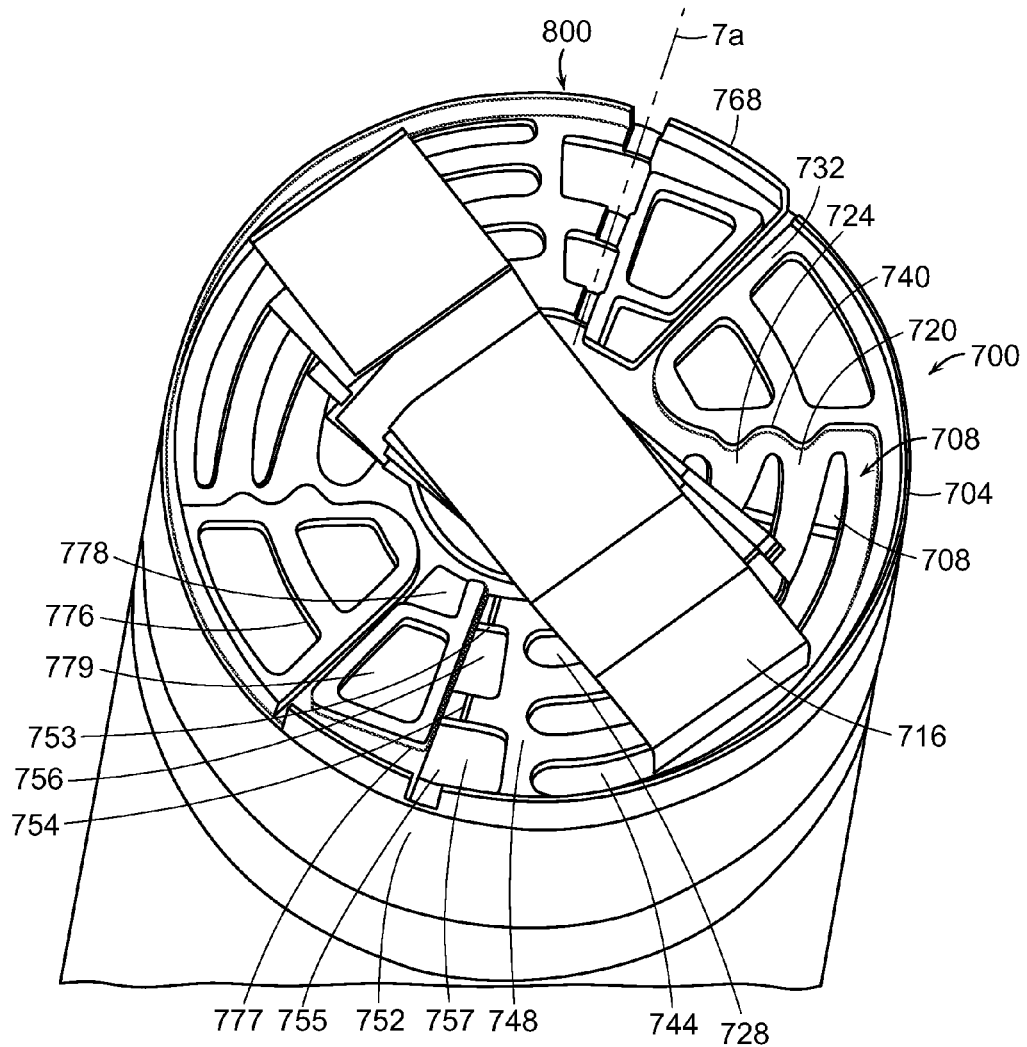
FIG. 7 is an exemplary embodiment of insulation portions attached to an electrochemical cell.

FIG. 7 illustrates an embodiment of an exemplary insulator configuration similar to the embodiments of FIGS. 4-6. The insulator configuration includes insulator portions 700 and 800. The insulator portion 700 has a peripheral edge 704 and a plurality of fingers 708. The fingers 708 may have rounded and/or tapered nose portions 712 to aid in insertion of the electrode tabs 716, as discussed above. The fingers 708 are spaced from each other in a radial direction with slots 720 being provided between adjacent fingers 708. The slots 720 are curved to have an arc shape and include two ends. One end 724 is open and other end 728 is closed to create an entry area for tabs of the electrochemical cell.

A latch platform 732 extends from a portion of the peripheral edge 704 and has a side area 740 facing the open end of the slots 720. The side area 740 moves with the latch 732 along the plane horizontal to the top surfaces of the fingers 708 to act as a gate for entry to the slots 720. The latch 732 may include a plurality of holes, such as the exemplary configuration in FIG. 7 having two polygon-shaped holes with rounded corner portions. Similar to the embodiments of FIGS. 4-6, the latch 732 is in a resting or unbiased position when not acted on by an external force, and is moved to a biased position when acted on by a force. When the latch 732 is in the biased position, an environment is created that accommodates entry of electrode tabs 734.

The plurality of slots 720 are provided between each adjacent pair of fingers 708 and between an outermost finger 708 and the peripheral edge 704. The number of fingers 708 and slots 720 may vary depending on factors, including, for example, the tab configuration of the electrochemical cell, the number of tabs and dimensions of the tabs. The outermost slot 744 is bordered by the peripheral edge 704 and comprises a wall extended in an arc shape. The fingers 708 merge with each other at a base 748 of the insulator portion 700. The base 748 extends from the peripheral edge 704 to an innermost one of the fingers 708.

A living hinge 752 is adjacent the base 748 to allow the insulator 700 to bend along a line 7a-7a of the hinge 752. The hinge 752 provides a flex point to aid with insertion of the insulator 700 to the tab configuration. The hinge 752 includes recessed portions 753, 754, 755 disposed adjacent to the openings 756, 757.

During installation, the gripper of a robotic device grabs an engagement portion of the insulator. The engagement portion may be similar to element 98 of FIG. 4. The engagement portion has a structure that is suitable for mating with the gripper and allows the insulator to be manipulated during the installation process.

The wall of peripheral edge 704 has a taper or ramp 756 that provides clearance for mating with an adjoining insulator. A sub-wall configuration 768 extends from the end most portion of the insulator 700 to the hinge 752 and merges with the rib. The sub-wall configuration 768 borders a sub-base area 776 including two recessed areas 777, 778 and a through hole 779. The areas 777, 778 could be used to place an identification mark (e.g., a letter "A" in this case) by which the two parts can be reliably differentiated.

A second insulator portion 800 is mated with the insulator portion 700 and electrode tabs 716 in a manner similar to that described above with respect to FIGS. 4-6.

Figure 8:
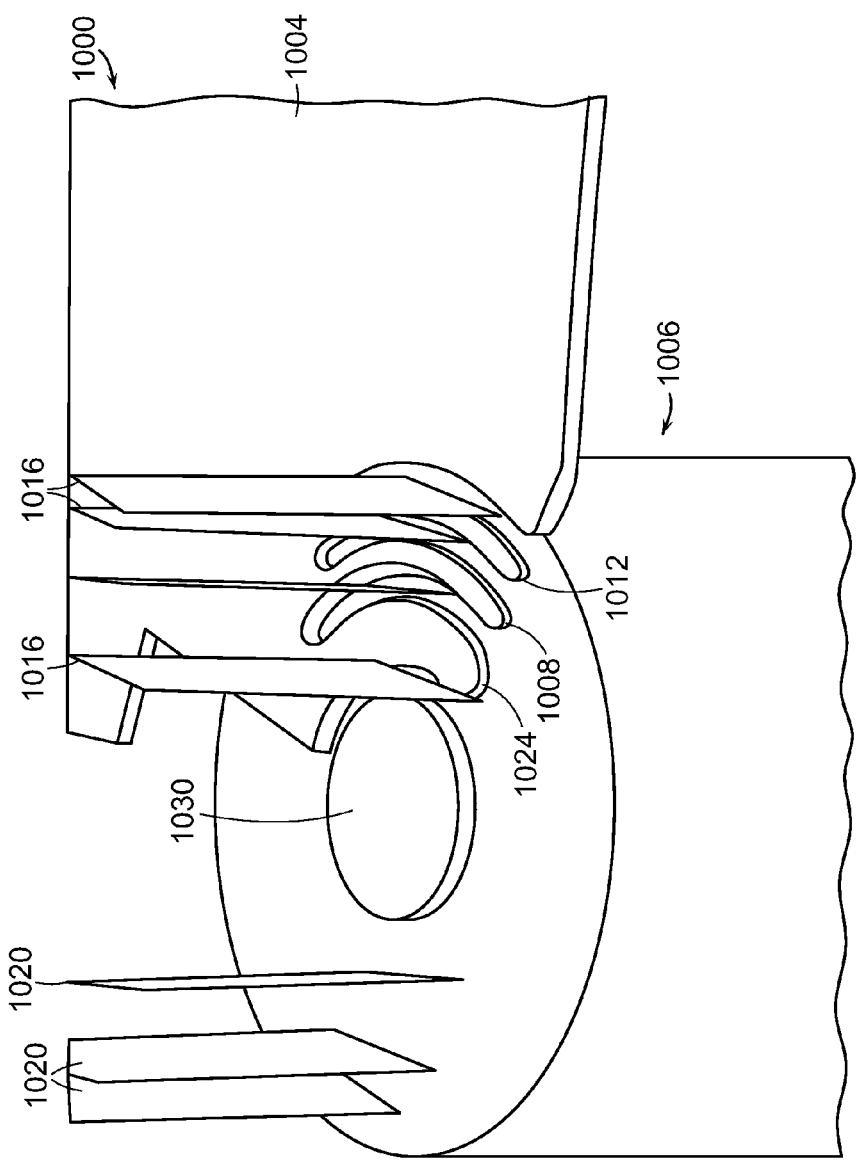
FIG. 8-10 are exemplary devices for bending electrode tabs of an electrochemical cell.
Figure 9:
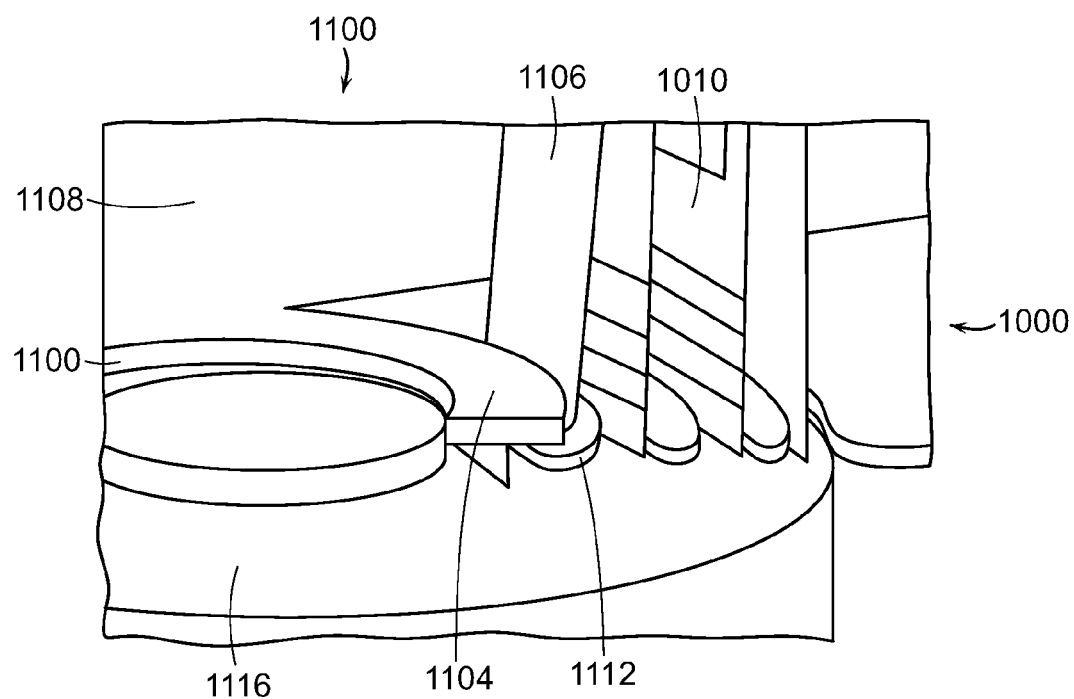
Figure 10:
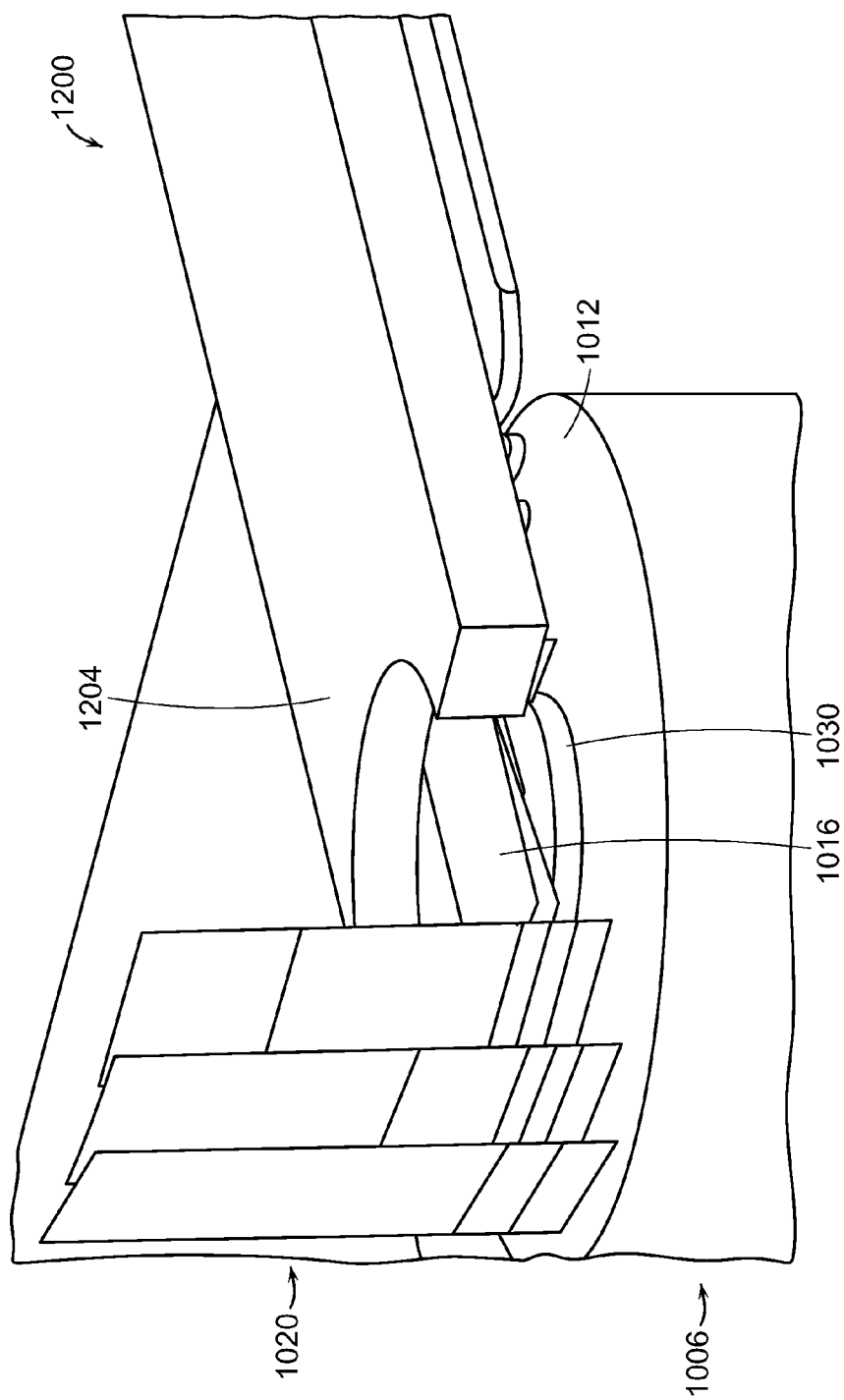

FIGS. 8-10 depict an exemplary non-limiting embodiment of an apparatus and method for bending electrode tabs prior to installation of insulator portions, on an electrochemical cell. FIG. 8 illustrates a holding tool 1000 having a base portion 1004 that may be driven in multiple directions, and rotationally moved around a center post 1030 of the electrochemical cell 1006. A plurality of fingers 1008 are formed in the base portion 1004 and are separated by a plurality of slots 1012. The slots 1012 are operable to accept electrode tabs 1016 of the electrochemical cell 1006. The electrode tabs 1016 extend from the slots 1012 in a manner that corresponds to the spacing between the fingers 1008 of the holding tool 1000. While the fingers 1008 and slots 1012 are shown with a curved configuration, they may be straight or have another shape that sufficiently accommodates the tabs 1016

The holding tool 1000 is manipulated by a controller in an appropriate direction, such as a rotation direction, to sufficiently engage the electrode tabs 1016. As shown in FIG. 9, the tabs 1016 are slid to an inner portion of the slots 1012. A separate bank of electrode tabs 1020 is disposed on the opposing side of electrochemical cell 1006. The separate bank of electrode tabs 1020 are acted on by the disclosed apparatus and method in the same manner as the tabs 1016.

The slots 1012 of the holding tool 1000 are formed in an arc shape and include an open end and a closed end. The fingers 1008 are curved to correspond to the slots 1012 and have rounded ends. The thickness of the fingers 1008 may be altered to correspond with different electrode tab configurations. The innermost finger 1024 of the embodiment in FIG. 8 has a width greater than the other fingers. The finger widths are determined by the spacing of the battery tabs as required to balance the electrical load to each. The space between fingers 1008 and the finger shape are determined to provide the correct bend radius when the tabs are bent toward the center of the jellyroll.

FIG. 9 illustrates a reverse bend forming tool 1100 used in conjunction with bending the electrode tabs 1016. The reverse bend forming tool 1100 has at least one finger 1104 for bending an electrode tab 1106. The finger 1104 extends from a base 1108 of the reverse bend forming tool 1100 and has an arc shape. The portion of the finger 1104 that engages the tab 1106 is shaped to press the tab 1106 in an outward radial direction over the underlying finger 1112 of the holding tool 1000. Accordingly, a bend is formed in the tab 1106 that corresponds to the area between the opposing finger 1112 of the holding tool 1000 and the reverse bend forming tool 1100. An aspect of the bend is to distance the inner electrode tab from the center post. The bend serves to reduce the effective axial stiffness of the tab. By reducing its axial stiffness, the amount of load transmitted through the tab (and its joint to the electrode) is considerably reduced. Such axial loads are typically encountered from a drop of the cell or exposure to normal vibration or shock loads.

Movement of the reverse bend forming tool 1100 is governed by either a controller used for moving the holding tool 1000 or another controller. Once the reverse bend forming tool 1100 is positioned so that the finger 1104 contacts the inner electrode tab 1106, the finger 1104 is driven toward the peripheral edge to create an outwardly facing bend in the tab 1106. The amount of movement is controllable to cause a predetermined portion of the tab 1106 to be substantially parallel to the top face 1116 of the electrochemical cell.

FIG. 10 illustrates an anvil 1200 used in conjunction with bending the electrode tabs 1016. The anvil 1200 has an end portion 1204 operable to apply force to the electrode tabs 1016 to fold the tabs 1016 inwardly towards the center post 1030. Depending on the tab configuration, the tabs 1016 may fold over onto each other, as shown in FIG. 10. A controller coordinates movement of the holding tool 1000 and anvil 1200 so that while the holding tool 1000 engages the electrode tabs 1016, the anvil 1200 applies force to the electrode tabs 1016 extending from the slots 1012, such that the electrode tabs 1016 are bent towards the electrochemical cell 1006 in an overlapping manner. The end portion 1204 of the anvil 1200 has a concave shape for engaging the electrode tabs 1016. Other configurations may be used for the end portion 1204 to provide for a suitable engagement with the electrode tabs 1016.

After the tabs 1016 are bent over the center post 1030, the anvil 1200 is removed in an opposite direction in which it was directed to bend the tabs. The operation is repeated to bend the adjacent bank of tabs 1020 over the center post 1030. In one embodiment the holding tool 1000, the forming tool 1100, and the anvil 1200 are optimally configured to accommodate electrode configurations that are misaligned, for example, by 15 degrees or less. In an alternative embodiment the holding tool 1000, the forming tool 1100, and the anvil 1200 are optimally configured to accommodate electrode configurations that are misaligned, for example, by, e.g., 15° or less, or 30° or less. In a further embodiment, the bank of tabs 1016 and 1020 are formed to provide free areas with spans of 115°. The free areas are portions between the grouped tabs that are not occupied by the tabs.

Figure 11:
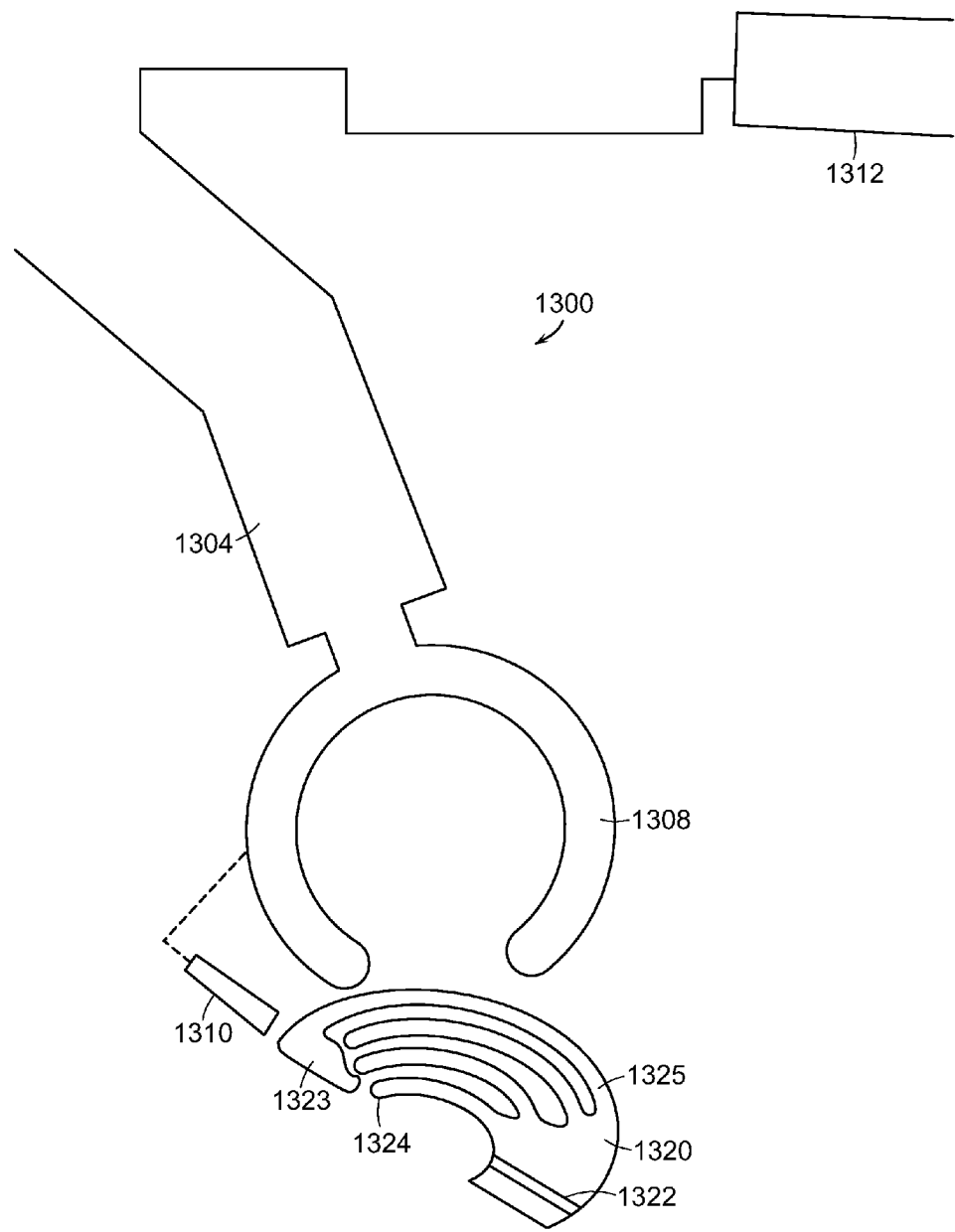
FIG. 11 is an exemplary embodiment of a robotic device used to attach an insulator portion to an electrochemical cell.

As discussed above, the insulator portions may be installed using a robotic device. In an exemplary embodiment, a robotic device 1300 comprises an arm 1304 and gripper 1308, as shown in FIG. 11. The robotic device 1300 also includes a controller 1312 which directs the arm 1304 and gripper 1308 to a location of an insulator portion 1320. The arm 1304 and gripper 1308 include a jointing configuration that allows for multi-direction movement. For example, the arm 1304 and gripper 1308 may move in the x, y and z directions, in addition to rotating. The controller 1312 communicates with actuators and other control mechanisms of the robotic device 1300. A non-limiting embodiment of the robotic device 1300 may include a commercially available 6-Axis Fanuc device with full servo control. In an exemplary embodiment, the robotic device 1300 could incorporate a driver pin 1310 that is pushed and pulled by an actuator. The driver pin 1310 is coupled to the robotic device 1300 and extends to bias latch 1323 to an opened position for installing the insulator portion 1320. The pin 1310 may push the latch 1323 in a radial direction away from the fingers 1324, so that the latch 1323 rotates in a clockwise direction around the base 1325 of the finger extending to the latch 1323. The pin 1310 may also be used to bias the latch 1323 in a plane perpendicular to the fingers, or bias the fingers 1324 in a plane perpendicular to latch 1323. After installation, the driver pin 1310 would be retracted.

In an alternative embodiment, the gripper may be in the form of a vacuum device. The vacuum device incorporates a vacuum-pad or other suitable connector portion to mate with the insulator or insulator portion. The vacuum device applies negative pressure to grip the insulator while it is installed on the tabs.

In operation, the arm 1304 and gripper 1308 are directed to a location of an insulator portion 1320, such as a parts bin or other assembly staging area. The gripper 1308 engages the insulator portion 1320 by a rib or other suitable engagement part 1322. The controller 1312 then drives the arm 1304 and gripper 1308 to perform the necessary movements for engaging the insulator 1320 with electrode tabs of an electrochemical cell that have been prepared as shown in FIGS. 8-10. For example, the controller 1312 can instruct the robotic device 1300 to the location of the insulator 1320 portion within the assembly line for subsequent attachment to the electrochemical cell. In an exemplary embodiment, the controller 1312 will follow the same or similar path used to bend the electrode tabs. The gripper 1308 remains in contact with the engagement rib during the installation process to impart the necessary rotational and directional movement so that fingers 1324 of the insulator portion 1320 engage the appropriate electrode tabs.

When an insulator portion, such as, e.g., 400 in FIG. 6, is directed downwardly towards the plurality of tabs 404, the latch 408 of the insulator portion 400 is pushed against at least one of the tabs 404 and forced to the biased position. This creates a path of entry from beneath the latch 408 to the open ends of the slots. After this path of entry is created, the gripper 1308 imparts a rotational force to the insulator portion 400 so that the tabs 404 are slid into the slots. In the exemplary embodiment of FIG. 6, the rotational direction would be counter-clockwise. After the insulator portion 400 is installed, a second insulator portion is selected by the robotic device and positioned in a manner similar to the first insulator portion 400, such that the first and second insulator portions mate to provide a disk configuration, as shown in FIGS. 5 and 7.

Exemplary assembly aspects are described using manual and automated operations. It will be appreciated that the operations may be augmented to accommodate more or less automated or manual operations. However, a useful aspect of exemplary embodiments is the ability for the electrode tabs to be accurately bent using automation, such as that described herein, and likewise coupled with the insulator portions using automation, such as a robotic device. Aspects of the invention accommodate the automated processes of tab bending and isolator installation, whereas prior insulators were often installed by hand. The particular designs of the present exemplary insulators are easily and effectively used in the automated process.

The above-described features may be implemented in combination with each other to provide various exemplary embodiments in accordance with the invention.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

The invention claimed is:

1. An insulator for engaging a plurality of electrode tabs of an electrochemical cell, the insulator comprising:
   a plurality of fingers, including a first finger and a second finger;
   a slot that separates the first finger from the second finger, the slot including a closed end and an open end;
   a peripheral edge extending in an arc shape;
   a latch disposed adjacent the open end of the slot, wherein the latch is movable from a resting position to a biased position: and,
   a living hinge extended from the peripheral edge to an inner peripheral portion of the insulator to allow the insulator to bend along the living hinge.

2. The insulator of claim 1, wherein the peripheral edge extends along an outermost one of the fingers to form a wall.

3. The insulator of claim 1, wherein when the latch is in the biased position a path of entry for at least one of the electrode tabs is increased, and the path of entry is decreased when the latch is in the resting position.

4. The insulator of claim 1, wherein a periphery of the latch has grooves that correspond to the fingers.

5. The insulator of claim 1, wherein a plurality of slots are provided, and one of the slots is between an outermost one of the plurality of fingers and the peripheral edge.

6. The insulator of claim 1, wherein the fingers merge with each other at a base portion, the base portion extending from the peripheral edge to an innermost one of the fingers.

7. The insulator of claim 1, comprising a rib that is extended from the peripheral edge to an inner peripheral portion of the insulator for engagement with a device that installs the insulator.

8. The insulator of claim 1, wherein the peripheral edge comprises a wall, and a portion of the wall adjacent the latch is ramped.

9. The insulator of claim 8, wherein the wall comprises a first and second section, the first section extending from the ramp to the living hinge, and the second section extending from the rib to an end of the insulator distal the ramp.

10. The insulator of claim 1, wherein the insulator comprises at least one of polyethylene terephthalate (PET), polypropylene (PP), polyethylene (PE), and polyimide (PI).

11. An insulator for engaging a plurality of electrode tabs of an electrochemical cell, the insulator comprising two separate pieces that form a disk shape when mated, each of the pieces comprising the insulator of claim 1.

12. The insulator of claim 11, wherein when the latch is in the biased position a path of entry for at least one of tabs is increased, and the path of entry is decreased when the latch is in the resting position.

* * * * *